(12) United States Patent
Constantinis

(10) Patent No.: US 10,871,455 B2
(45) Date of Patent: Dec. 22, 2020

(54) INSPECTION METHOD

(71) Applicant: E M & I (Maritime) Limited, Saint Helier (GB)

(72) Inventor: Daniel Constantinis, Saint Helier (GB)

(73) Assignee: E M & I (Maritime) Limited, Saint Helier (GB)

( * ) Notice: Subject to any disclaimer, the term of this patent is extended or adjusted under 35 U.S.C. 154(b) by 0 days.

(21) Appl. No.: 16/098,684

(22) PCT Filed: May 3, 2017

(86) PCT No.: PCT/GB2017/051234
§ 371 (c)(1),
(2) Date: Nov. 2, 2018

(87) PCT Pub. No.: WO2017/191447
PCT Pub. Date: Nov. 9, 2017

(65) Prior Publication Data
US 2019/0137413 A1    May 9, 2019

(30) Foreign Application Priority Data

May 4, 2016  (GB) .................................. 1607804.0

(51) Int. Cl.
*H04N 7/18* (2006.01)
*G01N 21/954* (2006.01)
(Continued)

(52) U.S. Cl.
CPC .......... *G01N 21/954* (2013.01); *G01M 3/005* (2013.01); *G01M 3/38* (2013.01); *G01S 17/89* (2013.01);
(Continued)

(58) Field of Classification Search
CPC combination set(s) only.
See application file for complete search history.

(56) References Cited

U.S. PATENT DOCUMENTS 5,425,279 A  *  6/1995  Clark ...................... C10B 45/00
                                                                  73/865.8
6,831,679 B1 * 12/2004  Olsson ................. G01N 21/954
                                                                    348/241
(Continued)

FOREIGN PATENT DOCUMENTS

CA       2499241 A1      9/2006
CN    201740777 U  *    2/2011
(Continued)

OTHER PUBLICATIONS

Nelson ("Generation and fusion of multiple image representations in automatic corrosion detection algorithms used with shipboard tank video inspection systems," Proc. SPIE 4731, Sensor Fusion: Architectures, Algorithms, and Applications VI, (Mar. 6, 2002); DOI: https://doi.org/10.1117/12.458375 (Year: 2002).*
(Continued)

*Primary Examiner* — Peet Dhillon
(74) *Attorney, Agent, or Firm* — Howard & Howard Attorneys PLLC

(57) ABSTRACT

A method of inspecting the inside of a vessel. The method includes the step of obtaining a visual image of the inside of the vessel using a camera. The method includes using a first three-dimensional scanner to obtain a low-resolution image of one or more surfaces of the inside of the vessel; and using a second three-dimensional scanner to obtain a high-resolution image of one or more objects inside of the vessel.

18 Claims, 3 Drawing Sheets

(51) Int. Cl.
*G01M 3/38* (2006.01)
*G01M 3/00* (2006.01)
*G01S 17/89* (2020.01)
*G03B 17/56* (2006.01)
*G06T 7/00* (2017.01)
*H04N 5/225* (2006.01)

(52) U.S. Cl.
CPC .......... G03B 17/561 (2013.01); G06T 7/0004 (2013.01); H04N 5/2252 (2013.01); G06T 2207/10028 (2013.01)

(56) References Cited

U.S. PATENT DOCUMENTS

| | | |
|---|---|---|
| 2005/0115337 A1 | 6/2005 | Tarumi |
| 2013/0335530 A1 | 12/2013 | Hatcher, Jr. et al. |
| 2014/0210947 A1* | 7/2014 | Finn .................... G01C 15/002 348/46 |
| 2014/0261137 A1* | 9/2014 | Donovan ................ B63B 71/00 114/312 |
| 2015/0079535 A1* | 3/2015 | Hollenbeck ............ A61B 1/253 433/29 |
| 2015/0348253 A1* | 12/2015 | Bendall .............. H04N 5/23293 348/86 |
| 2016/0338803 A1* | 11/2016 | Pesach .................. G06T 1/0007 |
| 2017/0010087 A1* | 1/2017 | Polidor ................ G01B 11/245 |
| 2018/0113083 A1* | 4/2018 | Van Dael ............. G01N 23/046 |

FOREIGN PATENT DOCUMENTS

| | | |
|---|---|---|
| WO | 2009120813 A1 | 10/2009 |
| WO | 2010015086 A1 | 2/2010 |

OTHER PUBLICATIONS

International Search Report for Application No. PCT/GB2017/051234 dated Aug. 8, 2017, 3 pages.

* cited by examiner

INSPECTION METHOD

CROSS-REFERENCE TO RELATED APPLICATIONS

The present application is the National Stage of International Patent Application No. PCT/GB2017/051234, filed on May 3, 2017, which claims priority to and all the benefits of U.K. Application No. 1607804.0, filed on May 4, 2016, which are both hereby expressly incorporated herein by reference in their entirety.

The present invention relates to a method of inspecting the inside of a vessel.

Entry of personnel into confined spaces, including for the inspection of pressure vessels and tanks, is hazardous and costly and should be avoided where practicable.

The Oil Gas and indeed many other industries are concerned with the safety risks involved in people entering confined spaces. Additional risks are encountered when the confined space involves working at height, for example in a large storage tank or on a ship or offshore production facility.

There is however a regulatory and classification requirement to inspect these confined spaces at regular intervals to assure the integrity of the structure. Such inspections involve having a competent person carry out a General Visual Inspection (GVI) and a Close Visual Inspection (CVI) of critical parts of the structure and an assessment of any structural deformation by various visual and/or mechanical means.

Where the structure shows signs of corrosion then there may be a further requirement to measure the remaining thickness of the steel to confirm the structural and leak integrity of the component or tank respectively.

Regulators and classification societies have provided guidance for alternative inspection methods and have stated that any alternative methods must provide an 'equivalent' quality and scope of inspection. Thus an alternative method should provide a GVI, CVI, structural deformation survey and a means of measuring wall thickness of critical components where there is evidence of corrosion.

In accordance with a first aspect of the present invention there is provided a method of inspecting the inside of a vessel, the method including the steps of:
obtaining a visual image of the inside of the vessel using a camera;
using a first three-dimensional scanner to obtain a low-resolution image of one or more surfaces of the inside of the vessel; and
using a second three-dimensional scanner to obtain a high-resolution image of one or more objects inside of the vessel.

It may be an advantage of the present invention that the method of inspecting the inside of a vessel is in a manner equivalent to that which a skilled surveyor or engineer would achieve if they were inside the vessel and had access to all parts of the vessel including within 'arm's length' of components subject to a Close Visual Inspection.

The steps of the method may be in any order. The inside of the vessel may be referred to as a confined space. The method of inspecting the inside of the vessel may be referred to as a method of inspection.

It may be an advantage of the present invention that the method of inspection is equivalent or at least substantially equivalent to the inspection that a competent person would achieve if they entered the vessel.

The step of obtaining a visual image of the inside of the vessel using a camera is typically for a General Visual Inspection (GVI) and/or Close Visual Inspection (CVI) of the inside of the vessel.

The camera is typically a high performance camera. The camera may be a VT 360 PT HD inspection camera supplied by visatec GmbH, a DEKRA company.

The method may include the step of positioning and/or locating the camera at different levels inside and/or from a particular access point and/or from different access points into the vessel. The camera may be mounted and/or attached to a pole so that it can be positioned in a suitable location to obtain the visual image of the inside of the vessel. The pole may be made of carbon fibre. The camera may be attached to the pole with an articulated joint. The articulated joint may mean the camera can be better positioned in a suitable location to obtain the visual image of the inside of the vessel.

It may be an advantage of the present invention that the camera can be positioned in the vessel using the pole and/or articulated joint such that the visual image obtained is free from shadow areas.

The camera normally has one or more of pan, tilt, zoom and integral lighting functionality. This may help in the generation of the General Visual Inspection (GVI) and/or Close Visual Inspection (CVI) of the inside of the vessel. These inspections may be part of and/or in accordance with an approved inspection plan.

The camera may be capable of operating in extreme conditions, including toxic gases, high levels of heat and humidity.

The camera may be operable in and/or under water. The camera may be referred to as watertight. In use the vessel may be dry or fully or partially filled with fluid, typically water.

The camera may be stabilised, that is the camera may be releasably attached to the vessel. The camera may be releasably attached to the vessel using a stabilising pole. The stabilising pole may be magnetically attached to the vessel. During the method of inspecting the inside of the vessel, the vessel may move. The vessel may be on or part of a moving ship or Floating Production, Storage and Offloading unit (FPSO) or Mobile Offshore Drilling Unit or Accommodation Vessel for example.

It may be an advantage of the present invention that, the quality of the visual image of the inside of the vessel that is obtained using the camera when the vessel is moving, is improved if the camera is stabilised using the stabilising pole.

Additionally or alternatively, the method may include the step of using the camera to obtain a plurality of visual images and normally in quick succession. It may be an advantage of the present invention that taking a plurality of visual images, normally in quick succession, mitigates any movement of the vessel, such that movement of the vessel does not substantially affect the overall quality of the visual image obtained.

The step of using the second three-dimensional scanner to obtain a high-resolution image of one or more objects inside of the vessel may be used to obtain linear dimensions of the one or more objects. The step may include obtaining more than one high-resolution image. At least one high-resolution image may be superimposed onto one of the objects. Using this superimposed image as a scale, the size of other objects may be measured. The objects are typically in an image frame. The one or more objects may include a crack in the vessel and/or crack anomalies. The one or more objects may be small components in the vessel.

The second three-dimensional scanner may be a short range scanner. Using the short range scanner it is typically possible to scan one or more objects with an accuracy of normally ±0.5 mm, typically ±0.1 mm. The accuracy may be referred to as high accuracy. The short range scanner may produce data which can then be replicated to a high accuracy. The method may include the step of using the data to produce a model of the object using a 3D printer.

The step of using a second three-dimensional scanner to obtain a high-resolution image of one or more objects inside of the vessel may be referred to as a short range inspection.

The second three-dimensional scanner may be a non-contact active, triangulation based 3D scanner.

The step of using a first three-dimensional scanner to obtain a lower-resolution image of one or more surfaces of the inside of the vessel may be referred to as a large volume scan or inspection. Using the first three-dimensional scanner it is typically possible to scan one or more surfaces of the inside of the vessel with an accuracy of normally ±2 mm, typically ±1 mm.

The low-resolution image of one or more surfaces of the inside of the vessel may be a three-dimensional image of the inside of the vessel. The three-dimensional image may be used to assess for any structural deformation of the vessel.

The low-resolution image may be a point cloud image. The method normally includes the step of manipulating the point cloud image so that a point of view of the point cloud image is in a position and/or is moved to a position where, the vessel can be assessed and/or viewed for being one or more of straight, plumb, square and free from structural deformation.

The first three-dimensional scanner may be a non-contact active, time-of-flight based 3D scanner.

The method may include the step of positioning and/or locating the first and/or second three-dimensional scanner at different levels inside the vessel. The first and/or second three-dimensional scanner may be mounted and/or attached to a pole so that it can be positioned in a suitable location to obtain the high and/or low resolution image from inside the vessel. The pole may be made of carbon fibre. The first and/or second three-dimensional scanner may be attached to the pole with an articulated joint. The articulated joint may mean the first and/or second three-dimensional scanner can be better positioned in a suitable location to obtain the high and/or low resolution image from inside of the vessel.

It may be an advantage of the present invention that the first and/or second three-dimensional scanner can be positioned in the vessel using the pole and/or articulated joint such that the high and/or low resolution image obtained is free from shadow areas.

The first and/or second three-dimensional scanner may be capable of operating in extreme conditions, including toxic gases, high levels of heat and humidity.

The first and/or second three-dimensional scanner may be operable in and/or under water. The first and/or second three-dimensional scanner may be referred to as watertight. In use the vessel may be dry or fully or partially filled fluid, typically with water.

The first and/or second three-dimensional scanner may be stabilised, that is the first and/or second three-dimensional scanner may be releasably attached to the vessel. The first and/or second three-dimensional scanner may be releasably attached to the vessel using a stabilising pole. The stabilising pole may be magnetically attached to the vessel. During the method of inspecting the inside of the vessel, the vessel may move. The vessel may be on or part of a moving ship or Floating Production, Storage and Offloading unit (FPSO) for example.

It may be an advantage of the present invention that the quality of the image of the inside of the vessel that is obtained using the first and/or second three-dimensional scanner when the vessel is moving is improved if the first and/or second three-dimensional scanner is stabilised using the stabilising pole.

The pole and/or stabilising pole used for the camera is typically the same but may be different to the pole and/or stabilising pole used for the first and/or second three-dimensional scanner.

The first three-dimensional scanner can normally obtain the low-resolution image of one or more surfaces of the inside of the vessel without using and/or the need for visible light inside the vessel. The low-resolution image of one or more surfaces of the inside of the vessel is usually in black and white and/or greyscale. The low-resolution image of one or more surfaces of the inside of the vessel is usually without colour.

A colour image is often required for the inspection of the inside of the vessel. A colour image is typically needed to assess structural integrity of the vessel. One or more of rust, staining and coating breakdown are more easily or only assessable using a colour image. The method may further include the step of upgrading the low-resolution image by taking visible light images at specified intervals during the step of using the first three-dimensional scanner. The colour data obtained from the visible light images may then be used to modify the low-resolution image to create a colour image, typically an accurate colour image, of the inside of the vessel. The visible light images may be taken using the camera.

The visual image, high-resolution image and low-resolution image may be combined to provide an overall or complete image of the inside of the vessel. The method of inspecting the inside of the vessel typically produces an overall or complete image of the inside of the vessel. The overall or complete image of the inside of the vessel is typically used to provide an inspection of the inside of the vessel.

The vessel may be referred to as a confined space. The vessel may be tens of meters in one or more of length, depth and height. The vessel may be a tank on and/or part of a ship. The ship may be a drillship or a cargo ship. The tank may be a ballast and/or water ballast tank. The tank may be a fuel and/or oil tank. The tank may be a J-tank. The vessel may be on or part of a Floating Production, Storage and Offloading unit (FPSO). The vessel may be a pressure vessel.

The one or more objects inside the vessel may be one or more parts of the vessel or one or more components inside the vessel. The one or more surfaces of the inside of the vessel are typically one or more of the inside walls of the vessel.

The first and second three-dimensional scanners may emit the same or different types of radiation. The radiation may be light, laser light, ultrasound or x-ray.

It may be an advantage of the present invention that the method of inspecting the inside of the vessel has one or more of enhanced safety, reduced cost in preparation and/or inspection and is a faster method of inspecting a vessel which may increase system availability, require fewer personnel and reduce downtime compared to conventional inspection methods.

The method may further include a structural assessment of the vessel by a competent person and/or engineer before the steps of using the camera, first three-dimensional scanner, and second three-dimensional scanner. The structural assessment will normally identify one or more of the probable deterioration, structural deformation, thickness gauging requirements, anomalies, work scope, defect tolerance standards and reporting standards for and/or in the vessel. The method may include the step of using an ultrasonic scanner and/or non-immersion ultrasonic scanner to measure the thickness of a wall or walls of the vessel.

The structural assessment of the vessel by a competent person and/or engineer may also include assessing where the camera, first three-dimensional scanner, and second three-dimensional scanner will be inserted into the vessel. The camera, first three-dimensional scanner, and second three-dimensional scanner are typically inserted into the vessel through an aperture and/or hole in the vessel. The aperture and/or hole may already exist and may be a man entry hatch, butterworth hatch or inspection port.

The method may include the step of preparing the aperture and/or hole so that a fluid and/or gas tight seal can be formed between the pole and/or stabilising pole and the aperture during the inspection of the inside of the vessel. It may be an advantage of the present invention that the fluid and/or gas tight seal minimises the need to one or more of clean, vent or empty the vessel during the inspection of the inside of the vessel. This may reduce the overall cost of the method of inspecting the inside of the vessel.

The method may further include filling or at least partially filling the vessel with a liquid, typically water. This may be particularly useful when the vessel has an internal shape such that one or more of the camera, first three-dimensional scanner, and second three-dimensional scanner cannot gain access to and or see all of the inside of the vessel, one or more objects inside of the vessel or one or more surfaces of the inside of the vessel respectively. The method then typically further includes mounting and/or attaching the camera, first three-dimensional scanner, and second three-dimensional scanner to a Remotely Operated Vehicle (ROV).

An immersion ultrasonic device and/or other inspection tools may be mounted and/or attached to the Remotely Operated Vehicle (ROV). The immersion ultrasonic device and/or other inspection tools may be used to measure the thickness of a wall or walls of the vessel. The other inspection tools may provide a gauging capability. The Remotely Operated Vehicle (ROV) may be stabilised.

The method may include the step of using the camera to obtain a plurality of visual images of the inside of the vessel. The plurality of visual images may be obtained from a number of different positions to create a photogrammetric image. The photogrammetric image may be used to measure and/or inspect the inside of the vessel, one or more objects inside of the vessel and one or more surfaces of the inside of the vessel.

An embodiment of the invention will now be described by way of example only and with reference to the accompanying drawings, in which.

There is herein described a method of inspecting the inside of a vessel, the method including the steps of obtaining a visual image of the inside of the vessel using a camera; using a first three-dimensional scanner to obtain a low-resolution image of one or more surfaces of the inside of the vessel; and using a second three-dimensional scanner to obtain a high-resolution image of one or more objects inside of the vessel.

Figure 1:
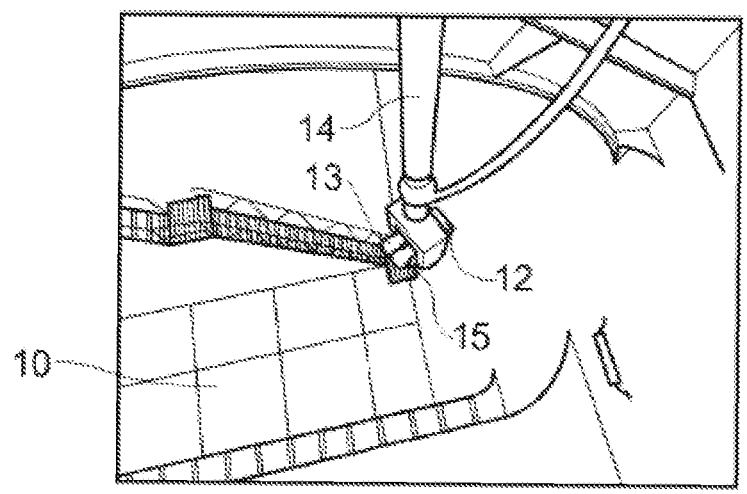
FIG. 1 shows a camera on a pole in a vessel.

FIG. 1 shows a camera 12 on a pole 14 in a vessel 10. The vessel 10 is dry, that is it is empty. The vessel 10 is a tank and a confined space. The camera is a VT 360 PT HD inspection camera supplied by visatec GmbH, a DEKRA company.

The camera 12 is being used to obtain a General Visual Inspection (GVI) and a Close Visual Inspection (CVI) of the inside of the vessel 10.

Figure 2:
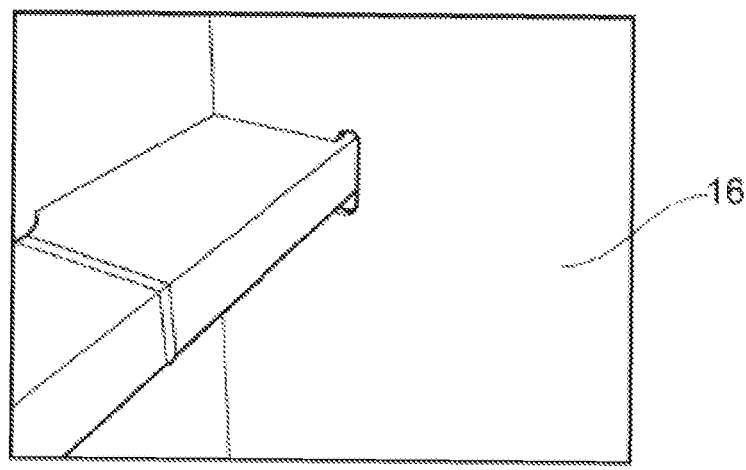
FIG. 2 shows a visual image of an inside of the vessel taken underwater.

FIG. 2 shows a visual image of an inside 16 of the vessel 10 taken underwater.

Figure 3:
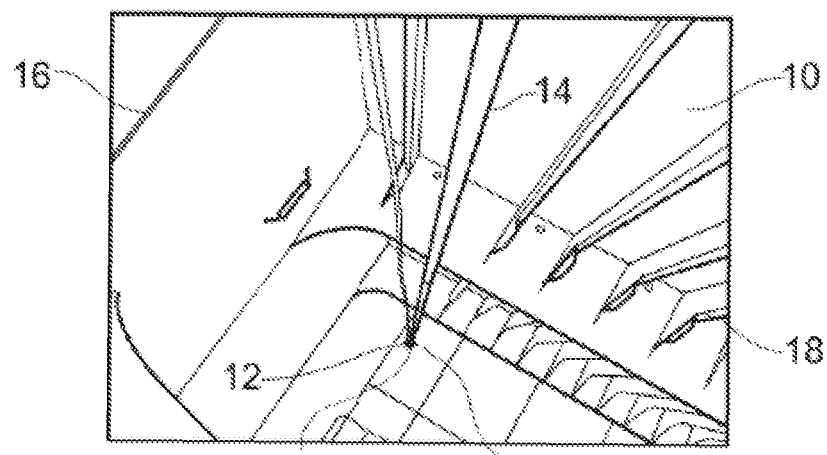
FIG. 3 shows the camera at the bottom of the vessel and objects inside the vessel.

FIG. 3 shows the camera 12 on the pole 14, at the bottom of the vessel 10 and objects 18 on an inside 16 the vessel 10.

Figure 4:
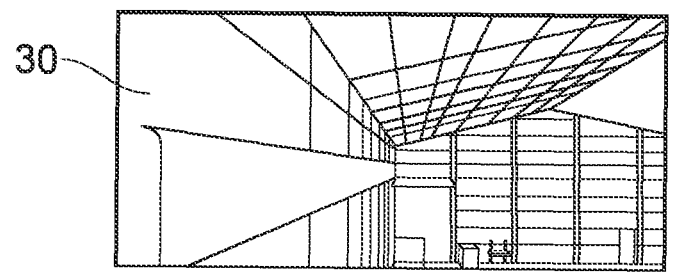
FIG. 4 shows a laser point cloud image.

FIG. 4 shows a laser point cloud image 30. The point cloud image 30 is a low-resolution image of surfaces of the inside of a building. The building has been used as an example and is equivalent to the vessel herein described.

The point cloud image 30 has been obtained using the first three-dimensional scanner 13. The image 30 is a low-resolution image of the surfaces of the inside of the vessel. The first three-dimensional scanner 13 is a non-contact active, time-of-flight based 3D scanner.

Figure 5:
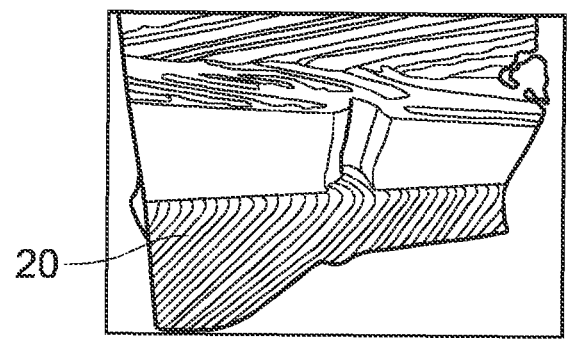
FIG. 5 shows a high-resolution image of an object inside the vessel.
Figure 6:
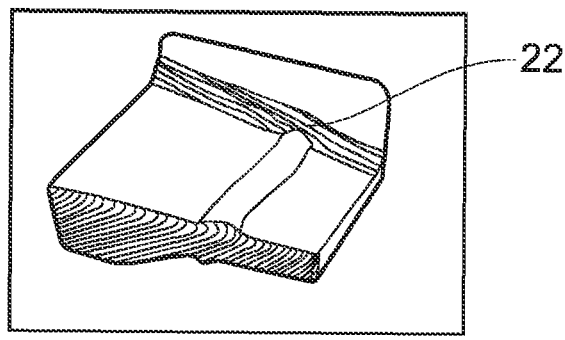
FIG. 6 shows a model of the object shown in FIG. 4, produced using a 3D printer.

FIG. 5 shows a high-resolution image of an object 20 inside the vessel. FIG. 6 shows a model 22 of the object 20 shown in FIG. 4, produced using a 3D printer.

The second three-dimensional scanner 15 has been used to obtain a high-resolution image of the object 20 inside the vessel 10. The second three-dimensional scanner 15 is a non-contact active, triangulation based 3D scanner. The second three-dimensional scanner 15 is a short range scanner.

The short range scanner 15 has been used to produce data which has then be replicated to a high accuracy and used to produce the model 22 of the object 20 using a 3D printer.

Figure 7:
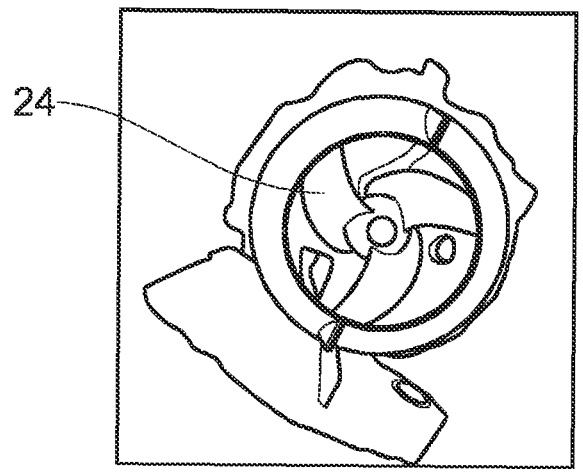
FIG. 7 shows a photogrammetric image of another object inside the vessel.

FIG. 7 shows a photogrammetric image of another object 24 inside the vessel.

Figure 8:
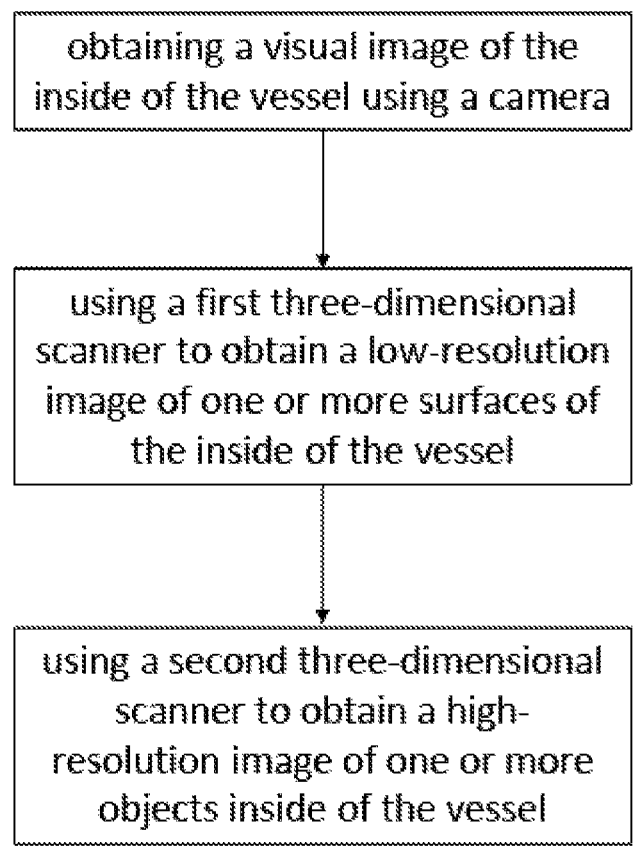
FIG. 8 shows a schematic flow chart of a method according to the invention.

FIG. 8 shows a schematic flow chart of a method according to the invention. The method comprises inspecting the inside of a vessel, including the steps of: obtaining a visual image of the inside of the vessel using a camera; using a first three-dimensional scanner to obtain a low-resolution image of one of more surfaces of the inside of the vessel; and using a second three-dimensional scanner to obtain a high-resolution image of one or more objects inside of the vessel. In at least some embodiments, the surfaces of the inside of the vessel are scanned using the first three-dimensional scanner with an accuracy of ±2 mm.

Modifications and improvements can be incorporated herein without departing from the scope of the invention.

The invention claimed is:

1. A method of inspecting the inside of a vessel, the method including steps of:
    obtaining a visual image of the inside of the vessel using a camera;

using a first three-dimensional scanner to obtain a low-resolution image of one or more surfaces of the inside of the vessel; and using a second three-dimensional scanner to obtain a high-resolution image of one or more objects inside of the vessel;

wherein the first three-dimensional scanner is a non-contact active, time-of-flight based 3D scanner, and wherein using the first three-dimensional scanner the one or more surfaces of the inside of the vessel are scanned with an accuracy of ±2 mm.

2. The method according to claim 1, the method further including the step of positioning the camera at different levels inside the vessel, the camera being mounted to a pole.

3. The method according to claim 2, the camera being attached to the pole with an articulated joint.

4. The method according to claim 1, wherein the camera has one or more of pan, tilt, zoom and integral lighting functionality.

5. The method according to claim 1, wherein the camera is capable of operating in extreme conditions, including toxic gases, high levels of heat and humidity.

6. The method according to claim 1, the method further including the step of stabilising the camera, that is the camera is releasably attached to the vessel.

7. The method according to claim 1, the method further including the step of using the camera to obtain a plurality of visual images in quick succession.

8. The method according to claim 1, wherein the step of using the second three-dimensional scanner to obtain a high-resolution image of one or more objects inside of the vessel is used to obtain linear dimensions of the one or more objects.

9. The method according to claim 1, wherein the second three-dimensional scanner is a short range scanner capable of scanning the one or more objects with an accuracy of ±0.5 mm.

10. The method according to claim 9, wherein the short range scanner produces data which is then used to produce a model of the object using a 3D printer.

11. The method according to claim 1, wherein the second three-dimensional scanner is a non-contact active, triangulation based 3D scanner.

12. The method according to claim 1, wherein the low-resolution image of the one or more surfaces of the inside of the vessel is a three-dimensional image of the inside of the vessel and is used to assess for any structural deformation of the vessel.

13. The method according to claim 1, wherein the first and second three-dimensional scanners are stabilised, that is the first and second three-dimensional scanners are releasably attached to the vessel.

14. The method according to claim 1, wherein the first and second three-dimensional scanners emit light, laser light, ultrasound or x-ray.

15. The method according to claim 1, wherein the method includes at least partially filling the vessel with water, the method further including mounting the camera, first three-dimensional scanner, and second three-dimensional scanner to a Remotely Operated Vehicle (ROV) and putting the ROV in the vessel to inspect the inside of the vessel.

16. The method according to claim 1, wherein the method comprises the inspection of the inside of the vessel without requiring entry of a person into the inside of the vessel.

17. A method of inspecting the inside of a vessel, the method including steps of:

obtaining a visual image of the inside of the vessel using a camera;

using a first three-dimensional scanner to obtain a low-resolution image of one or more surfaces of the inside of the vessel;

using a second three-dimensional scanner to obtain a high-resolution image of one or more objects inside of the vessel, wherein the first and second three-dimensional scanners are capable of operating in extreme conditions, including toxic gases, high levels of heat and humidity.

18. The method according to claim 1, wherein at least one or more of: the camera;

the first three-dimensional scanner; and the second three-dimensional scanner is positioned in the vessel using an articulated joint such that the image obtained is free from shadow areas.

\* \* \* \* \*